(12) United States Patent
Larsson et al.

(10) Patent No.: US 12,151,891 B2
(45) Date of Patent: Nov. 26, 2024

(54) METHOD, A COMPUTER PROGRAM AND A DEVICE FOR TRANSPORTING PALLETS

(71) Applicant: EAB Aktiebolag, Smalandsstenar (SE)

(72) Inventors: Christer Larsson, Smalandsstenar (SE); Stefan Kjellstrom, Smalandsstenar (SE)

(73) Assignee: EAB Aktiebolag, Smalandsstenar (SE)

( * ) Notice: Subject to any disclaimer, the term of this patent is extended or adjusted under 35 U.S.C. 154(b) by 854 days.

(21) Appl. No.: 17/295,332

(22) PCT Filed: Nov. 21, 2019

(86) PCT No.: PCT/EP2019/082126
§ 371 (c)(1),
(2) Date: May 19, 2021

(87) PCT Pub. No.: WO2020/109139
PCT Pub. Date: Jun. 4, 2020

(65) Prior Publication Data
US 2022/0017305 A1   Jan. 20, 2022

(30) Foreign Application Priority Data
Nov. 27, 2018 (SE) .................................. 1851467-9

(51) Int. Cl.
*B65G 1/137* (2006.01)
*B65G 1/04* (2006.01)

(52) U.S. Cl.
CPC ......... *B65G 1/1375* (2013.01); *B65G 1/0471* (2013.01); *B65G 1/0492* (2013.01); *B65G 2201/0267* (2013.01)

(58) Field of Classification Search
CPC .. B65G 1/1375; B65G 1/0471; B65G 1/0492; B65G 2201/0267; B65G 2203/0233; B65G 2207/22; B65G 1/0414; B65G 1/065
See application file for complete search history.

(56) References Cited

U.S. PATENT DOCUMENTS 3,800,963 A * 4/1974 Holland ................. B65G 1/065
                                                        414/281
3,880,299 A * 4/1975 Zollinger ............... G06Q 10/08
                                                        414/273
(Continued)

FOREIGN PATENT DOCUMENTS

JP     2015-214381 A    12/2015
JP     2017-226504 A    12/2017
WO     WO 2014/026049 A2  2/2014

OTHER PUBLICATIONS

European Office Action issued Mar. 28, 2024 in European Patent Application No. 19 809 751.1, citing document 15 therein, 5 pages.
(Continued)

*Primary Examiner* — Michael Collins
(74) *Attorney, Agent, or Firm* — Oblon, McClelland, Maier & Neustadt, L.L.P.

(57) ABSTRACT

A method, a computer program product, and a device determine a transport instruction for an automated vehicle which transports a pallet with goods in a pallet rack channel by determining a pallet depth; determining a first pallet position; determining a firebreak zone; calculating a second pallet position from the determined pallet depth, the determined first pallet position, and the determined firebreak zone, such that the second pallet position lies between the load end and the first pallet position and such that the pallet with the pallet depth does not extend into the firebreak zone when it is stored at the second pallet position; and forming (Continued)

a transport instruction based on the second pallet position such that the automated vehicle can transport the pallet to the second pallet position.

15 Claims, 11 Drawing Sheets

(56) References Cited

U.S. PATENT DOCUMENTS

| | | | |
|---|---|---|---|
| 5,160,294 | A | 11/1992 | Petter |
| 5,368,174 | A * | 11/1994 | Clark ................. A62C 3/00 211/183 |
| 9,725,240 | B2 | 8/2017 | Salichs |
| 10,202,240 | B2 * | 2/2019 | De Angelis ............ A47B 63/00 |
| 10,314,395 | B2 * | 6/2019 | McGhee, III ........ A47B 47/028 |
| 11,498,757 | B2 * | 11/2022 | Austrheim ........... B65G 1/0485 |
| 2007/0065259 | A1 * | 3/2007 | Talley ................. B65G 1/0407 414/279 |
| 2008/0237163 | A1 | 10/2008 | Smith |
| 2017/0101264 | A1 * | 4/2017 | Brumm ................... B65G 1/02 |
| 2017/0120090 | A1 * | 5/2017 | Magnone ................ A62C 37/46 |
| 2018/0237183 | A1 * | 8/2018 | McGhee, III ........ A47B 47/028 |
| 2018/0242738 | A1 | 8/2018 | Willix |

OTHER PUBLICATIONS

International Search Report issued on Mar. 6, 2020 in PCT/EP2019/082126 filed on Nov. 21, 2019.

* cited by examiner

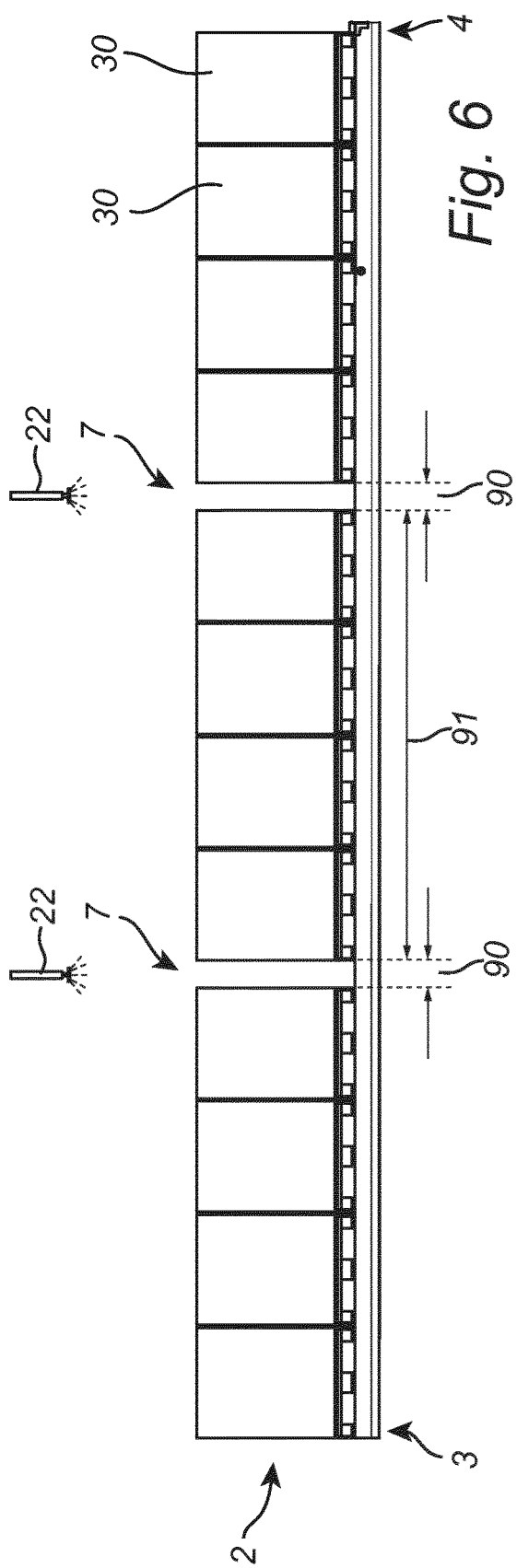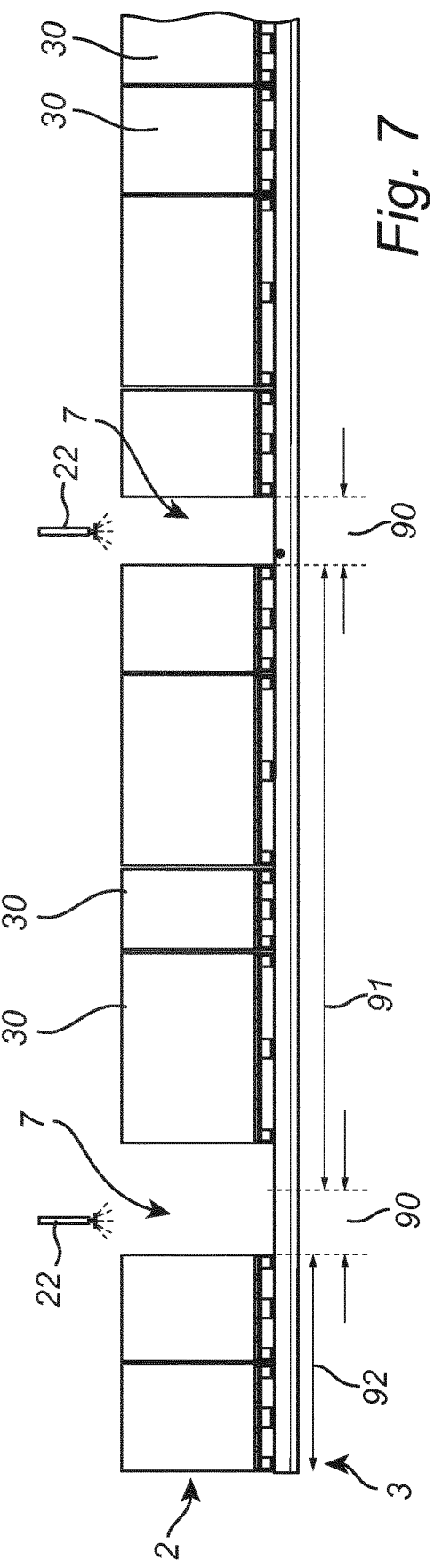

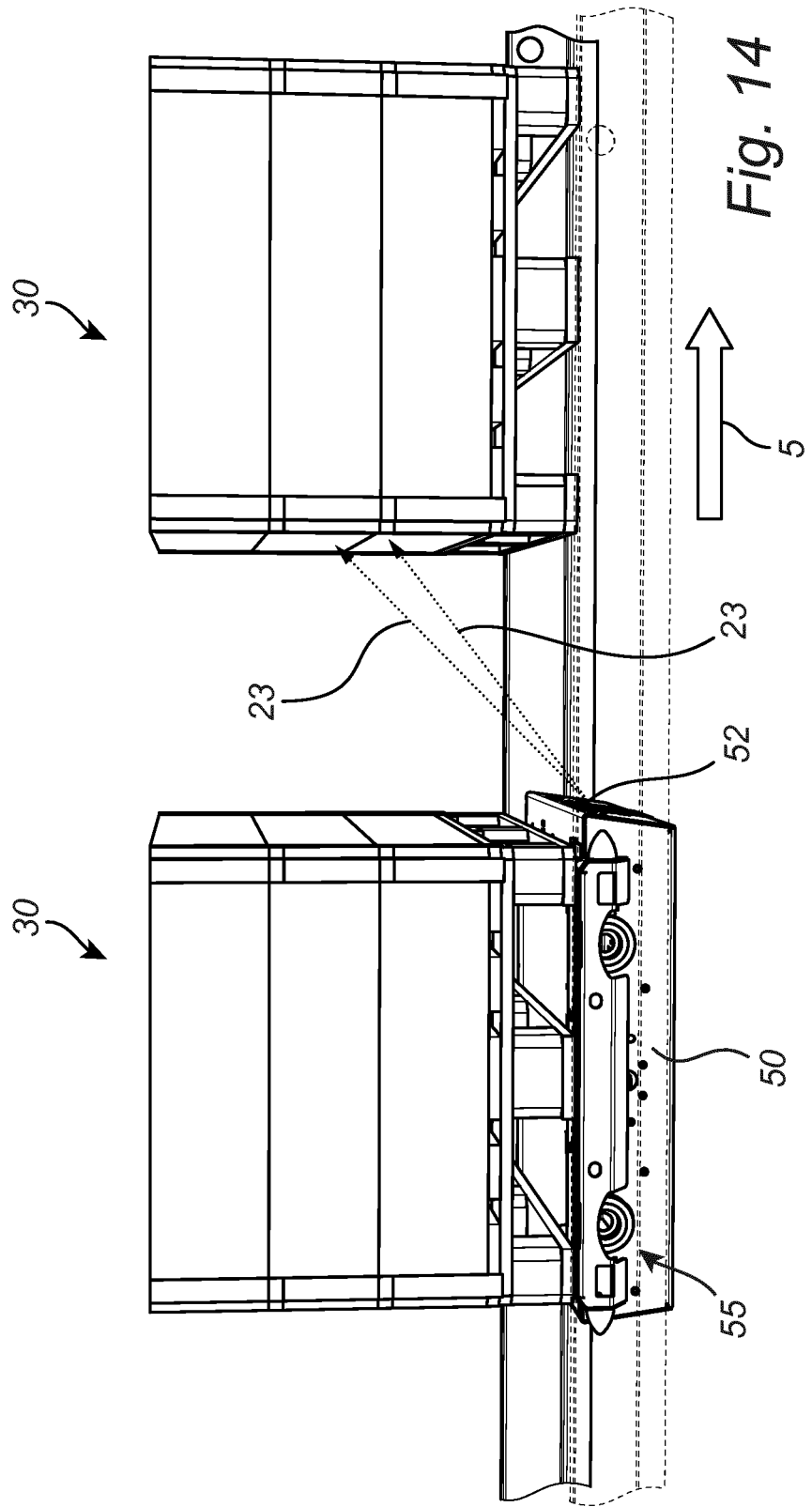

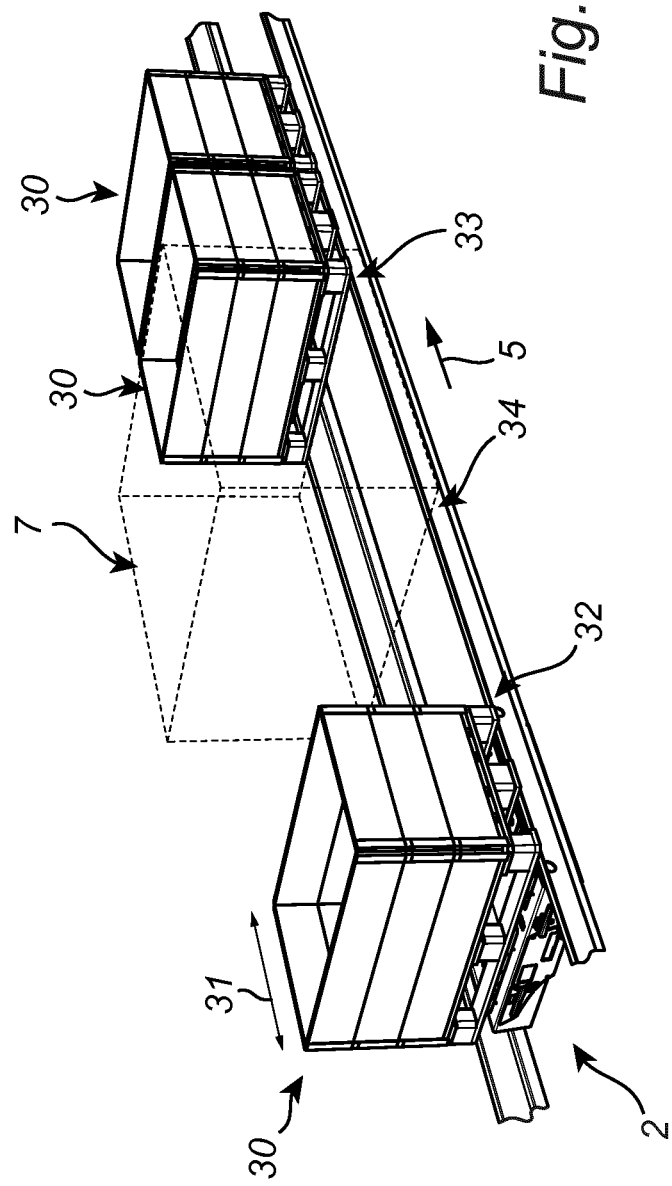

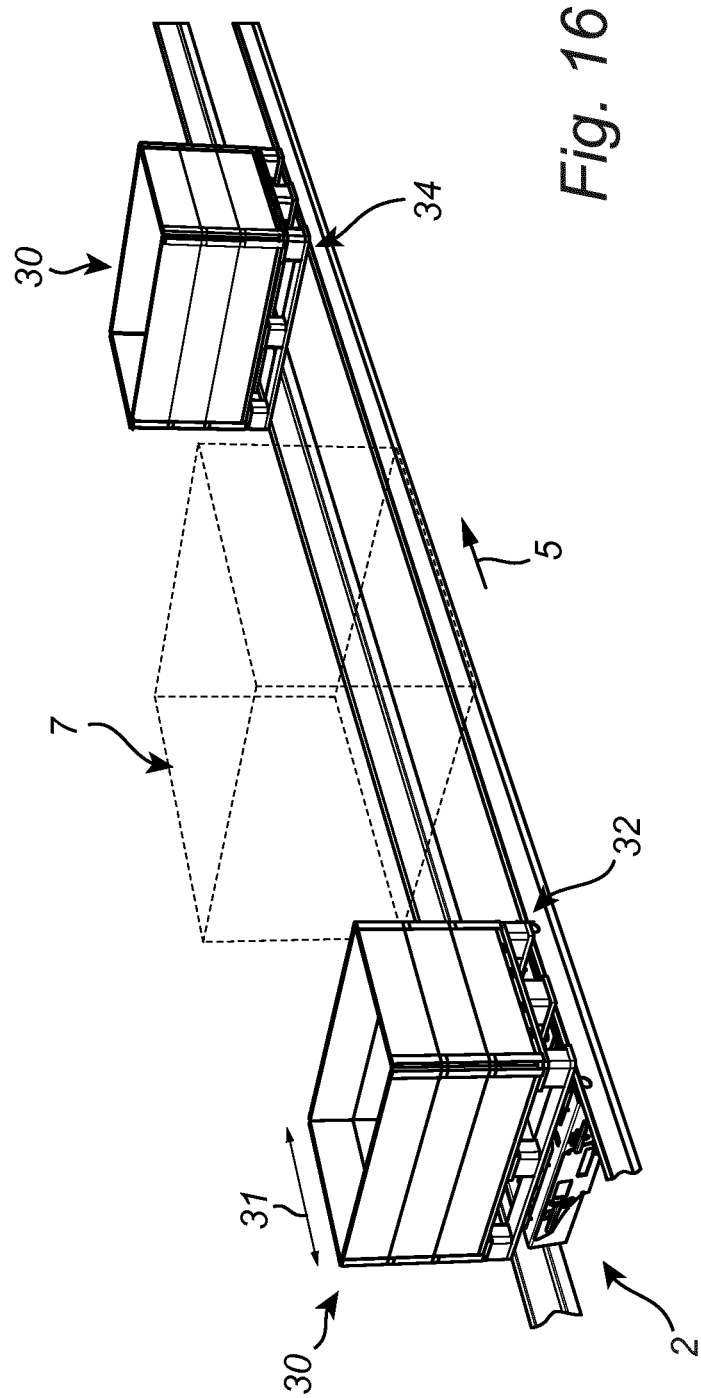

METHOD, A COMPUTER PROGRAM AND A DEVICE FOR TRANSPORTING PALLETS

TECHNICAL FIELD

The present invention relates generally to industrial storage systems and, more particularly, to automated vehicles for transport of pallets in pallet racks.

BACKGROUND

Pallet racks are frequently used in warehouses for storing pallets with goods. The pallet racks comprise a number of shelves on top of each other, wherein the pallets may be stored on the shelves. The pallet racks are often arranged one after another such that aisles are formed in between. A forklift may transport a pallet through an aisle and lift the pallet to a shelf to be stored or collect a previously stored pallet. In order to utilize the space in the warehouse efficiently the shelves can be several pallets deep. In high density pallet racks the shelves may be so deep that the forklift only reaches the outermost pallet or pallets. A system may then be arranged such that the pallet rack is divided into pallet rack channels wherein each pallet rack channel stores a que of pallets along a line. The pallet rack channels generally extend perpendicular to the aisle and several pallet rack channels are generally stacked on top of each other. The forklift may transport a pallet to one of the ends of the pallet rack channel. Another pallet transport means is generally needed to transport the pallet further into the pallet rack channel.

Pallet transport means for transport within the pallet rack channel may e.g. comprise wheeled carts that fit onto inclined rails arranged as a push back system, as described in U.S. Pat. No. 4,715,765. A forklift may place a new pallet in the que of pallets by pushing the pallet into a previously stored pallet such that the entire que is pushed back. The rails may be inclined towards the end of the pallet rack channel from which the pallets will be collected. The inclined rails may also comprise rollers such that pallets may move along the rail directly without a wheeled cart.

Pallet transport means for transport within the pallet rack channel may also comprise an automated vehicle as described in SE449471B. The automated vehicle may be placed at one of the ends of the pallet rack channel by the forklift. A pallet with its load may be placed on the automated vehicle which may then move into the pallet rack channel and place the pallet next to a previously stored pallet. The automated vehicle may also be used to collect a previously stored pallet and bring it back to the forklift.

Typically, the existing solutions for deep pallet rack channels result in densely packed pallets. This is unfavorable from a fire safety perspective. There is thus a need for improvements within this context.

SUMMARY

In view of the above, it is thus an object of the present invention to overcome or at least mitigate the problems discussed above. In particular it is an object of the invention to provide a method for determining a transport instruction for an automated vehicle which transports a pallet with goods in a pallet rack channel which provides an increased fire safety in e.g. warehouses for storing pallets.

These and other objects of the invention are at least partly met by the invention as defined in the independent claims. Preferred embodiments are set out in the dependent claims.

According to a first aspect of the invention, there is provided a computer implemented method for determining a transport instruction for an automated vehicle which transports a pallet with goods in a pallet rack channel, wherein the pallet rack channel is a shelf in a pallet rack which accepts a plurality of pallets to be stored sequentially along one direction between a load end of the pallet rack channel and a far end of the pallet rack channel, wherein the automated vehicle is a vehicle which can automatically transport the pallet from the load end to a pallet position, wherein the pallet position is a position of the pallet along the one direction between the load end and the far end, and wherein the transport instruction is an instruction to the automated vehicle to transport the pallet to the pallet position, the method comprising:

determining a pallet depth, wherein the pallet depth is a measure of a space that the pallet with goods will occupy along the one direction of the pallet rack channel when the pallet is stored in the pallet rack channel;

determining a first pallet position, wherein the first pallet position is the pallet position furthest from the load end which is free to accept a pallet to be stored;

determining a firebreak zone, wherein the firebreak zone is a region along the one direction of the pallet rack channel in which no pallet with goods should extend;

calculating a second pallet position from the determined pallet depth, the determined first pallet position and the determined firebreak zone, such that the second pallet position lies between the load end and the first pallet position and such that the pallet with the pallet depth does not extend into the firebreak zone when it is stored at the second pallet position;

forming the transport instruction based on the second pallet position such that the automated vehicle can transport the pallet to the second pallet position;

As used herein, the term pallet should be construed as a transport structure suitable for supporting goods during transport. It should be understood that when loaded with goods a pallet can take up more space than when unloaded. The automated vehicle may be a robot which moves, e.g. on wheels, on a bottom set of rails in the pallet rack channel. The pallets may e.g. be stored on a top set of rails in the pallet rack channel. When a pallet is standing on the top set of rails the automated vehicle may move underneath the pallet along the bottom set of rails. The automated vehicle may furthermore comprise a platform with adjustable height. Once positioned underneath a pallet the automated vehicle may raise the platform and lift the pallet above the top set of rails. The automated vehicle may move along the bottom set of rails with the pallet lifted above the top set of rails. The automated vehicle may stop and lower the platform to place the pallet at a new position. The automated vehicle may furthermore comprise sensors detecting the surrounding. The sensors may e.g. be optical sensors looking forwards or backwards in the direction of the pallet rack channel. The sensors may also be sensors looking upwards, registering e.g. pallet related features of a pallet on the top set of rails above. The sensors may also be looking at distinguishing features of the rails, e.g. marks which provide information. The sensors may also measure a distance travelled by the automated vehicle, e.g. a distance travelled with respect to a reference mark at the load end of the pallet rack channel.

The inventors have realized that fire safety in a warehouse with high density pallet racks may be improved. An automated vehicle may be provided with a transport instruction which allows it to arrange the pallets such that firebreaks are formed, wherein the firebreaks are gaps in between stored pallets. This may delay the spread of a fire or enhance firefighting measures.

An advantage of the inventive concept may be that it may create a firebreak between two consecutive pallets within a pallet rack channel. This may delay the spread of a fire along the pallet rack channel. The invention may ensure that a pallet is not placed in a determined firebreak zone.

The firebreak zone may be determined in many different ways. Firebreak zones may be predetermined. The location and extension of a firebreak zone within a pallet rack channel may e.g. be stored in a computer memory. Determining a firebreak zone may thus mean retrieving the location and extension of the fire break zone from the memory. The location and extension of a firebreak zone within a pallet rack channel may also be defined mathematically. Determining a firebreak zone may thus mean mathematically determining a region. Firebreak zones may also be defined by markers, e.g. marks, RFID-tags, transmitters, or the like, in the pallet rack. Firebreak zones may also be defined by markers, e.g. marks, RFID-tags, transmitters, or the like, in the pallet rack surrounding. For example, determining a firebreak zone may mean registering a marker in the form of a drilled hole in one of the rails, the hole marking e.g. the beginning of a firebreak zone. Another example may be registering a wireless signal from a transmitter situated at a fire sprinkler, marking a firebreak zone under the sprinkler.

The automated vehicle or an external unit controlling the automated vehicle may avoid pallets being stored in the fire break zones by determining the firebreak zones and keeping track of the position the automated vehicle in a common coordinate system. The common coordinate system may e.g. be a one-dimensional coordinate system wherein a position is defined as a distance into the pallet rack channel measured e.g. from a reference point at the load end. The common coordinate system may also be a three-dimensional coordinate system covering e.g. the entire warehouse.

An advantage of the inventive concept may also be that it may create a firebreak extending over several pallet rack channels. For example, if the firebreak zones are determined in the same manner for all pallet rack channels in a pallet rack the firebreaks may be aligned. For example, 1 meter wide firebreak zones may be predefined at depths of 10 meters and 20 meters into a pallet rack with a total depth of 30 meters. Two firebreaks in the form of 1 meter wide slices through the pallet rack wherein no pallets are stored may then be formed. A fire spreading from the load end to the far end may then be forced to cross two firebreaks of at least 1 meter, regardless of which rout the fire takes. It should be understood that aligning the firebreak zones from one pallet rack channel to another may be achieved by a single automated vehicle following the same firebreak zone definition when working in different pallet rack channels. It should also be understood that aligning the fire break zones from one pallet rack channel to another may also be achieved by several automated vehicle following the same firebreak zone definition when working in different pallet rack channels. It should be understood that firebreaks may be defined as a slice perpendicular to the direction of the pallet rack channels. It should also be understood that firebreaks may be defined as a slice along another direction, e.g. parallel to the pallet rack channels. The firebreak does not necessarily need to extend through the entire pallet rack. For example, a volume of particularly flammable goods, extending over 3×3 pallet rack channels 10 meters into the pallet rack channels, may be boxed in by several firebreaks. A top and bottom firebreak and a left and right firebreak may form planes parallel to the pallet rack channel while a rear firebreak forms a plane perpendicular to the pallet rack channels. The five firebreaks together with the aisle may enclose the particularly flammable goods. The rest of the pallet rack which may comprise less flammable goods may comprise further firebreaks which may be more widely spaced apart and/or only form planes perpendicular to the pallet rack channels.

An advantage of the inventive concept may also be that firebreaks may be aligned with firefighting measures. For example, firebreaks may be formed under fire sprinklers or other fire suppression systems, e.g. sitting in the ceiling, such that water, foam or fire extinguishing gas may penetrate deep into the pallet rack instead of being stopped by the top layer of pallets. A firebreak may also form a chimney which is aligned e.g. to a heat and smoke vent e.g. in the ceiling such that heat and smoke may be effectively moved through the pallet rack to the vent where it may be removed from the building. Thus, the fire break zone may be determined based on a position of a firefighting measure, wherein the firefighting measure is located in a ceiling above the pallet rack.

An advantage of the inventive concept may also be that firebreaks may be formed accurately even if pallets of different depth are used. This may make the pallet rack more versatile as it may accept pallets from different vendors while still maintaining a good fire protection. For example, if one would store the pallets with a space between every tenth pallet the spaces would not line up between pallet rack channels if one channel was used for one vendor with one pallet depth and the adjacent pallet rack channel was used for another vendor with another pallet depth.

An advantage of the inventive concept over other methods may also be that more pallets can fit into the pallet rack while still maintaining a certain level of fire protection. This may result in a more cost effective storage. For example, when there are firebreaks cutting through all the pallet rack channels at the same distance it may be possible to store the pallets in between the firebreaks densely packed and achieve the same fire protection as if a spacer was introduced between each pallet. The number of pallets fitting into the pallet rack may be higher with densely packed pallets and well aligned firebreaks than with a spacer for each pallet.

It should be understood that the pallet depth may be determined in different ways. It may e.g. be directly measured by the automated vehicle when it is moving under the pallet or standing still under the pallet. It may e.g. be measured using light beams from the automated vehicle which are reflected back to one or more photodetectors. It may be measured in an image taken by a camera on the automated vehicle, a camera on the forklift or a camera elsewhere in the vicinity of the pallet rack. The pallet depth may be an exact measure of the space a specific pallet with goods occupies along the one direction of the pallet rack channel. It may also be a maximum value of a space a pallet occupies. For example, it may be known that a certain type of pallet which is 1 meter deep never is loaded with goods wider than 1.3 meters. Once the automated vehicle has detected that the pallet is of that certain type the pallet depth may be set to 1.3 meters without actually measuring how much the load protrudes outside the pallet. It should also be understood that it may be known that no pallet is supposed to have a pallet depth larger than a maximum value. The pallet depth may then be determined to be the maximum value, regardless of the pallet type. The pallet depth may be stored in e.g. a RFID tag or QR code fastened to the pallet and read by the automated vehicle.

It should be understood that the method may be implemented in the automated vehicle or in an external unit, e.g. in a server which controls one or more automated vehicles.

It should be understood that the first pallet position may be determined in different ways. The first pallet position may e.g. be a position which marks where in the pallet rack channel the que of sequentially stored pallets starts. It may be a point marking the position of the outermost point on the outermost pallet as seen from the load end. The first pallet position may also include a fitting margin, e.g. 15 cm closer to the load end than the outermost point on the outermost pallet as seen from the load end. The first pallet position may relate to a point on the pallet which is about to be transported to the first pallet position. It may e.g. relate to the innermost edge on the pallet which is about to be transported, i.e. the pallet edge furthest away from the load end. Placing a pallet at a first pallet position may thus mean placing the innermost edge of the pallet at the first pallet position. It should be understood that the first pallet position may also be the pallet position furthest from the load end which is free to accept a pallet with the pallet depth to be stored. The first pallet position may be determined by sensors on the automated vehicle. For example, the automated vehicle may measure the distance between itself and the outermost pallet in the pallet rack channel. The automated vehicle may also measure the distance between itself and a reference point somewhere in the pallet rack channel, e.g. at the load end. The automated vehicle may e.g. have forward looking sensors, looking into the pallet rack channel as it moves inwards. The sensors may be emitting one or more light beams and recording the reflection on a photo detector or a photo detector array. The distance between the automated vehicle and a pallet already stored in the pallet rack channel may e.g. be measured as a function of the position of the light beam reflex on a photo detector array. The distance may also be measured using radar sensors or other types of distance sensors. The automated vehicle may also measure where in the pallet rack channel it is positioned by measuring e.g. a number of revolutions, or parts of revolutions, the wheels have made using a magnetic sensor. The number of revolutions may be counted with reference to e.g. a reference point at the load end. The automated vehicle may also have backwards looking sensors measuring the distance to the load end. The automated vehicle may also determine its position by other means, e.g. using radio beacons and triangulation. It should also be understood that the first pallet position may be determined based only on measuring the position of the automated vehicle. The automated vehicle may be driven into the pallet rack channel until the carried pallet bumps into a previously stored pallet. The automated vehicle may register that it cannot move further and use its current position as the first pallet position. The first pallet position may also be determined using sensors outside the automated vehicle, e.g. cameras in the vicinity of the pallet rack.

It should be understood that the second pallet position may be calculated in different ways from the determined pallet depth, the determined first pallet position and the determined firebreak zone. For example, it may be possible to calculate if a pallet, with a pallet depth, which is positioned at a first pallet position extends into the firebreak zone. If it does not, the second pallet position may be set to be the first pallet position. If it does, a new pallet position which e.g. is just outside the firebreak zone on the side towards the load end may be set as the second pallet position. It should also be understood that the second pallet position may be a different pallet position. For example, if it is calculated that only one pallet fits between the first pallet position and the firebreak zone, then the second position may be a position between the first pallet position and the firebreak zone wherein the pallet will not extend into the firebreak zone. Calculating the second pallet position may also be done by moving a pallet from position to position and checking if it extends into the firebreak zone, this may be repeated until the pallet no longer extends into the firebreak zone.

It should be understood that the transport instruction may be formed in different ways. For example, the transport instruction may be an instruction to the automated vehicle to move to a specific position and to place the pallet there. The transport instruction may also be an instruction to the automated vehicle to move a specific distance in a specific direction and then to put the pallet down. The transport instruction may also be an instruction to the automated vehicle to travel a distance in the pallet rack channel, e.g. travel a distance on rails in the pallet rack channel. Thus, the travel instruction may be an instruction to the automated vehicle to load the pallet sequentially after a previously loaded pallet. The travel instruction may also be an instruction to the automated vehicle to load the pallet in succession to a previously loaded pallet.

In one embodiment determining a pallet depth comprises determining a pallet characteristic from which the pallet depth can be derived.

The pallet characteristic may be a distinguishing trait of the pallet. For example, the pallet characteristic may be a distinguishing trait of the pallet which is detectable by the automated vehicle as it moves underneath the pallet. The pallet characteristic may also be a distinguishing trait of the pallet which is detectable by the automated vehicle when it is next to the pallet. The pallet characteristic may also be a distinguishing trait of the pallet which is detectable by a sensor which is not placed on the automated vehicle. The pallet characteristic may be a characteristic which is detectable by optical means, e.g. a width of a feature on the pallet, a number of features on the pallet, a QR code or a bar code. The pallet characteristic may also be a characteristic which is wirelessly detectable, e.g. a RFID tag. The pallet depth may be derived directly from the pallet characteristic, e.g. the pallet depth may be encoded in an RFID tag. The pallet depth may also be derived indirectly from the pallet characteristic, it may e.g. be known that pallets with a certain number of a particular feature have a particular pallet depth.

An advantage with the embodiment may be that the pallet depth may not need to be measured. It may be easier to measure a characteristic than measuring the entire pallet depth. For example, when the automated vehicle is positioned next to or underneath the pallet the entire pallet depth may not be within the field of view of the sensors on the automated vehicle. However, a smaller feature which may be linked with the pallet depth may well be within the field of view of the automated vehicle.

In one embodiment the pallet characteristic is at least one of: a width of a deckboard support of the pallet, a distance between two deckboard supports of the pallet, an amount of deckboard supports that the pallet comprises.

A deckboard support may be a member that supports a decking on top of which goods is placed. Different pallet types may have different deckboard support widths, different deckboard support spacing, and/or different amounts of deckboard supports. A pallet may comprise a number of deckboard supports which are visible from an automated vehicle underneath or next to the pallet. The deckboard support may be a bottom board, wherein the bottom board may be a board which forms the contact surface between the pallet and e.g. a floor. The bottom board may support a stringer or a block which in turn supports the deckboard. The deckboard support may be a stringer, e.g. for a stringer pallet. The deckboard support may also be a block, e.g. for a block pallet or for a europallet.

An advantage of determining the pallet depth from the deckboard supports may be that most pallets comprise deckboard supports. Therefore, the pallets may not need to be marked in any special way.

In one embodiment determining a pallet depth comprises comparing the determined characteristic to a list stored in a computer memory, the list mapping a plurality of pallet depths of a pallet and a plurality of predefined characteristics.

It should be understood that the list may be stored in a computer memory of the automated vehicle or in the computer memory of an external unit. It should also be understood that there may be several lists. For example, a pallet characteristic of a pallet from one manufacturer may correspond to a certain pallet depth while the same pallet characteristic of a pallet from another manufacturer may correspond to a different pallet depth. There may than be different lists for pallets coming from different manufacturers.

An advantage may be that a list may be easily updated when pallet types are changed in the warehouse.

In one embodiment determining a pallet depth comprises setting the pallet depth to a width of the pallet along the one direction of the pallet rack channel when the pallet is stored in the pallet rack channel.

An advantage may be that it is easier to determine the width of the pallet along the one direction of the pallet rack channel than to determine the width of the load on the pallet. It may e.g. be hard to estimate the width of the load from the viewpoint of the automated vehicle. On the other hand it may be easy to get an accurate value of the width of the pallet as the pallet itself may be closer to the automated vehicle, e.g. when it moves underneath the pallet. It may also be easy to get an accurate value of the width of the pallet from a pallet characteristic. If it is known that the pallets rarely are loaded in a manner where the load protrudes outside the pallet the pallet width may be used as the pallet depth. It should be understood that there may be additional mechanisms which ensures that a pallet does not extend into a firebreak zone if the pallet depth is not equal to the pallet width in reality. For example, if the automated vehicle receives an instruction to move to a position and it cannot reach that position because the load extends outside the pallet and bumps into the load of another pallet. Then the pallet depth may be recalculated. It should also be understood that it may be acceptable that part of the goods actually extend into the firebreak zone on the occasions when the goods extend outside the pallet in an unexpected manner.

In one embodiment determining a pallet depth comprises setting the pallet depth to a width of the goods on the pallet along the one direction of the pallet rack channel when the pallet is stored in the pallet rack channel.

The width of the goods may be a directly measured width. The width of the goods may also be an estimated width. For example, it may be estimated that the goods generally do not protrude more than 20 cm outside the pallet. The pallet depth may then e.g. be set to the pallet width plus 40 cm.

An advantage may be that it may be possible to ensure that no goods extend into a firebreak zone. This may enhance the fire safety. Another advantage may be that the goods of a pallet carried by the automated vehicle does not bump into the goods of other pallets during transport. This may prevent damages on the goods.

In one embodiment determining the first pallet position comprises determining a distance measurement by the automated vehicle in the pallet rack channel, wherein the distance measurement relates to at least one of: a distance between the automated vehicle and a pallet already stored in the pallet rack channel, a distance between the automated vehicle and the load end.

An advantage may be that determining a distance measurement by the automated vehicle in the pallet rack channel is an easy way to determine a pallet position. It may be implemented without any positioning means outside the automated vehicle. There may be no need for sensors in the pallet rack or any surveillance of the pallet rack. The only sensors needed may be placed on the automated vehicle. When the automated vehicle moves from one pallet rack channel to another, e.g. when a forklift moves the automated vehicle to another pallet rack channel, the sensors move as well. There may not be a need for one or several sensors which covers all pallet rack channels simultaneously.

The first pallet position may e.g. be determined by the automated vehicle measuring the distance from the automated vehicle to the load end, e.g. by recording how far it has travelled from the load end, and measuring the distance from the automated vehicle to the outermost pallet in the pallet rack channel. By combining these measurements, the position of the outermost pallet in the pallet rack channel relative to the load end may be calculated. The first pallet position may also be determined by the automated vehicle measuring the distance from the automated vehicle to the load end and then driving into the pallet rack channel until it bumps into the next pallet or until a proximity sensor detects that it is getting close to the next pallet. The first pallet position may also be determined by the automated vehicle measuring a distance between the automated vehicle and a pallet already stored in the pallet rack channel and combining this measurement with a measurement of the automated vehicle position which may be acquired e.g. by a positioning system which relies on distance measurements to other object or which do not rely in distance measurements at all.

In one embodiment determining the first pallet position comprises receiving a position from a computer memory, wherein the computer memory stores information about previous transports of pallets with goods in the pallet rack channel.

An advantage may be that the first pallet position may be determined very quickly. This may reduce the time it takes to deposit a pallet in the pallet rack channel. An advantage may also be that the automated vehicle may not need to make any measurements at all in order to determine the first pallet position or that fewer measurement or less accurate measurements are required. For example, the automated vehicle may receive a position representing where the last pallet was placed in the pallet rack channel. This position may be just after a firebreak zone, as seen from the load end, such that the next pallet to be stored will not fit between the firebreak zone and the position of the last pallet. It is then possible that the automated vehicle does not need to drive through the firebreak zone just to check where the next pallet is. The automated vehicle may directly place the pallet before the firebreak zone.

It should be understood that the information about previous transports of pallets with goods in the pallet rack channel may be recorded by the automated vehicle itself or by another automated vehicle or by other means. It should also be understood that the computer memory may be located in the automated vehicle, in a server, or in another device.

In one embodiment determining the firebreak zone comprises receiving a firebreak zone width and a firebreak zone spacing for a periodic repetition of firebreak zones in the pallet rack channel, wherein the firebreak zone width is the width of the individual firebreak zones in the periodic repetition of firebreak zones along the one direction of the pallet rack channel, and wherein the fire break zone spacing is the spacing between the individual firebreak zones in the periodic repetition of firebreak zones along the one direction of the pallet rack channel.

An advantage may be that a periodic repetition of firebreak zones is safer than a non-periodic repetition. A periodic repetition may prevent sections having more pallets than other sections. Such sections with a lot of pallets may represent a weak link from a fire safety perspective. Another advantage may be that a storage arrangement may be described in a manner which requires very little memory. For example, one number representing the firebreak zone spacing and one number representing the firebreak zone width may be sufficient to describe a storage arrangement of an entire warehouse. The automated vehicle may e.g. be configured to place the pallets such that there are pallets from the load end and a distance equal to the firebreak zone spacing into the pallet rack channel. After this distance there may be a firebreak zone with the firebreak zone width, then a new section of pallets for a distance equal to the firebreak zone spacing and so forth. By placing the pallets according to this scheme in all the pallet rack channels the firebreak zones may align. Using a periodic repetition of firebreak zones may also make it possible for an automated vehicle with limited computational power to quickly determine e.g. where the nearest firebreak zone is with respect to the first pallet position.

It should be understood that the firebreak zone width and the firebreak zone spacing may be received from a memory inside or outside the automated vehicle. It should also be understood that the firebreak zone width and the firebreak zone spacing may be received from a measurement device in or outside the automated vehicle which measures firebreak zone characteristics which may be e.g. markings in the pallet rack channel or the surrounding of the pallet rack channel, QR codes, RFID tags etc.

In one embodiment determining the firebreak zone comprises receiving a distance between the load end and the firebreak zone in the pallet rack channel which is closest to the load end, the distance being a distance along the one direction of the pallet rack channel.

An advantage may be that such a distance may make it possible to shift an arrangement of firebreak zones, e.g. a periodic arrangement, a fixed distance from the load end. For example, fire sprinklers in the ceiling may be arranged periodically and one may want to align the firebreak zones with this periodicity. However, depending on how the different pallet racks are positioned with respect to the fire sprinklers the first firebreak zone in one pallet rack should perhaps not be placed at the same distance from the load end as the first firebreak zone in another pallet rack. If a distance between the load end and the firebreak zone in the pallet rack channel which is closest to the load end is received the automated vehicle may adjust the firebreak zones in the pallet rack it is currently working in.

It should be understood that the distance between the load end and the firebreak zone in the pallet rack channel which is closest to the load end may be received from a memory inside or outside the automated vehicle. It should also be understood that distance between the load end and the firebreak zone in the pallet rack channel which is closest to the load end may be received from a measurement device in or outside the automated vehicle which measures firebreak zone characteristics which may be e.g. markings in the pallet rack channel or the surrounding of the pallet rack channel, QR codes, RFID tags etc.

In one embodiment determining the firebreak zone comprises receiving a firebreak zone list from a computer memory, wherein the firebreak zone list defines at least one region in the pallet rack channel which is a firebreak zone.

An advantage may be that the firebreak zones not necessarily need to be periodically distributed. For example, if fire sprinklers are not distributed periodically one may want to account for this when the firebreak zones are defined. There may also be a need for defining specific regions of a pallet rack channel or a pallet rack wherein the firebreak zones should have a distribution which differs from the rest of the pallet rack channel or the rest of the pallet rack, perhaps because more fire hazardous goods will be stored there. An advantage of determining the firebreak zone from a list may also be that this can be done quickly and with limited requirements on computational power. A list may also quickly and dynamically be changed. For example, as pallets with goods are loaded into the pallet rack one may want to redefine the firebreak zones based on how fire hazardous the goods that goes into the pallet rack is.

It should be understood that the computer memory may be placed in the automated vehicle, in a server, or in another device.

In one embodiment the method further comprises determining pallet-vehicle alignment instructions, wherein the pallet-vehicle alignment instructions are instructions to the automated vehicle such that it can align a predefined reference point on the pallet with a predefined reference point on the automated vehicle.

An advantage may be that by aligning a reference point on the pallet with a reference point on the automated vehicle it may be possible to accurately determine where the pallet is in relation to e.g. the load end if it is known where the automated vehicle is in relation to the load end. For example, the innermost edge, as seen from the load end, of the automated vehicle may be aligned with the innermost edge of the pallet. Thus the position of the automated vehicle, as measured from its innermost edge, may become the same as the position of the pallet, as measured from its innermost edge.

It should be understood that the pallet-vehicle alignment instructions may be to find an edge of the pallet, e.g. by moving the automated vehicle underneath the stationary pallet and finding the edge using a sensor on the automated vehicle which looks upwards and then stopping once the edge is detected. It should also be understood that once the edge is found the automated vehicle may move a predetermined distance with respect to the edge such that a specific feature on the automated vehicle has a well defined distance to a specific feature on the pallet. It should also be understood that the reference points do not need to be edges. For example, the reference point on the automated vehicle may be a sensor location and the reference point on the pallet may be a mark or an identifier which may be detected by the sensor.

According to a second aspect of the invention, there is provided a computer program product comprising a computer-readable medium storing computer-readable instructions which, when executed on a processing unit, will cause the processing unit to perform the method according to the first aspect of the invention.

Effects and features of this second aspect are generally analogous to those described above in connection with the first aspect. Embodiments mentioned in relation to the first aspect are generally compatible with the second aspect.

Such a computer program product may thus provide a possibility to install and execute the program in order to obtain the above-discussed advantages of the method.

According to a third aspect of the invention, there is provided a device connected to an automated vehicle which transports a pallet with goods in a pallet rack channel, wherein the device is configured to determine a transport instruction for the automated vehicle, wherein the pallet rack channel is a shelf in a pallet rack which accepts a plurality of pallets to be stored sequentially along one direction between a load end of the pallet rack channel and a far end of the pallet rack channel, wherein the automated vehicle is a vehicle which can automatically transport the pallet from the load end to a pallet position, wherein the pallet position is a position of the pallet along the one direction between the load end and the far end, and wherein the transport instruction is an instruction to the automated vehicle to transport the pallet to the pallet position, the device comprising one or more processors configured for:

determining a pallet depth, wherein the pallet depth is a measure of a space that the pallet with goods will occupy along the one direction of the pallet rack channel when the pallet is stored in the pallet rack channel;

determining a first pallet position, wherein the first pallet position is the pallet position furthest from the load end which is free to accept a pallet to be stored;

determining a firebreak zone, wherein the firebreak zone is a region along the one direction of the pallet rack channel in which no pallet with goods should extend;

calculating a second pallet position from the determined pallet depth, the determined first pallet position and the determined firebreak zone, such that the second pallet position lies between the load end and the first pallet position and such that the pallet with the pallet depth does not extend into the firebreak zone when it is stored at the second pallet position;

forming the transport instruction based on the second pallet position such that the automated vehicle can transport the pallet to the second pallet position;

Effects and features of this third aspect are generally analogous to those described above in connection with the first aspect. Embodiments mentioned in relation to the first aspect are generally compatible with the third aspect.

It should be understood that the device may be physically connected to the automated vehicle, the device may e.g. be a processor in the automated vehicle. It should also be understood that the device may be wirelessly connected to the automated vehicle, the device may e.g. be a processor in a server wherein the server communicates with the automated vehicle wirelessly.

In one embodiment the device is implemented in the automated vehicle.

An advantage may be that the automated vehicle may operate autonomously. There may be no need for installing any infrastructure to support the automated vehicle.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

FIG. 6 is a side view of a pallet rack channel.
FIG. 7 is a side view of a pallet rack channel.
FIG. 14 is a perspective view of an automated vehicle measuring a distance to a pallet.
FIG. 15 is a perspective view of an automated vehicle in a pallet rack channel.
FIG. 16 is a perspective view of an automated vehicle in a pallet rack channel.

DETAILED DESCRIPTION

In cooperation with attached drawings, the technical contents and detailed description of the present invention are described thereinafter according to a preferable embodiment, being not used to limit the claimed scope. This invention may be embodied in many different forms and should not be construed as limited to the embodiments set forth herein; rather, these embodiments are provided for thoroughness and completeness, and fully convey the scope of the invention to the skilled person.

Figure 1:
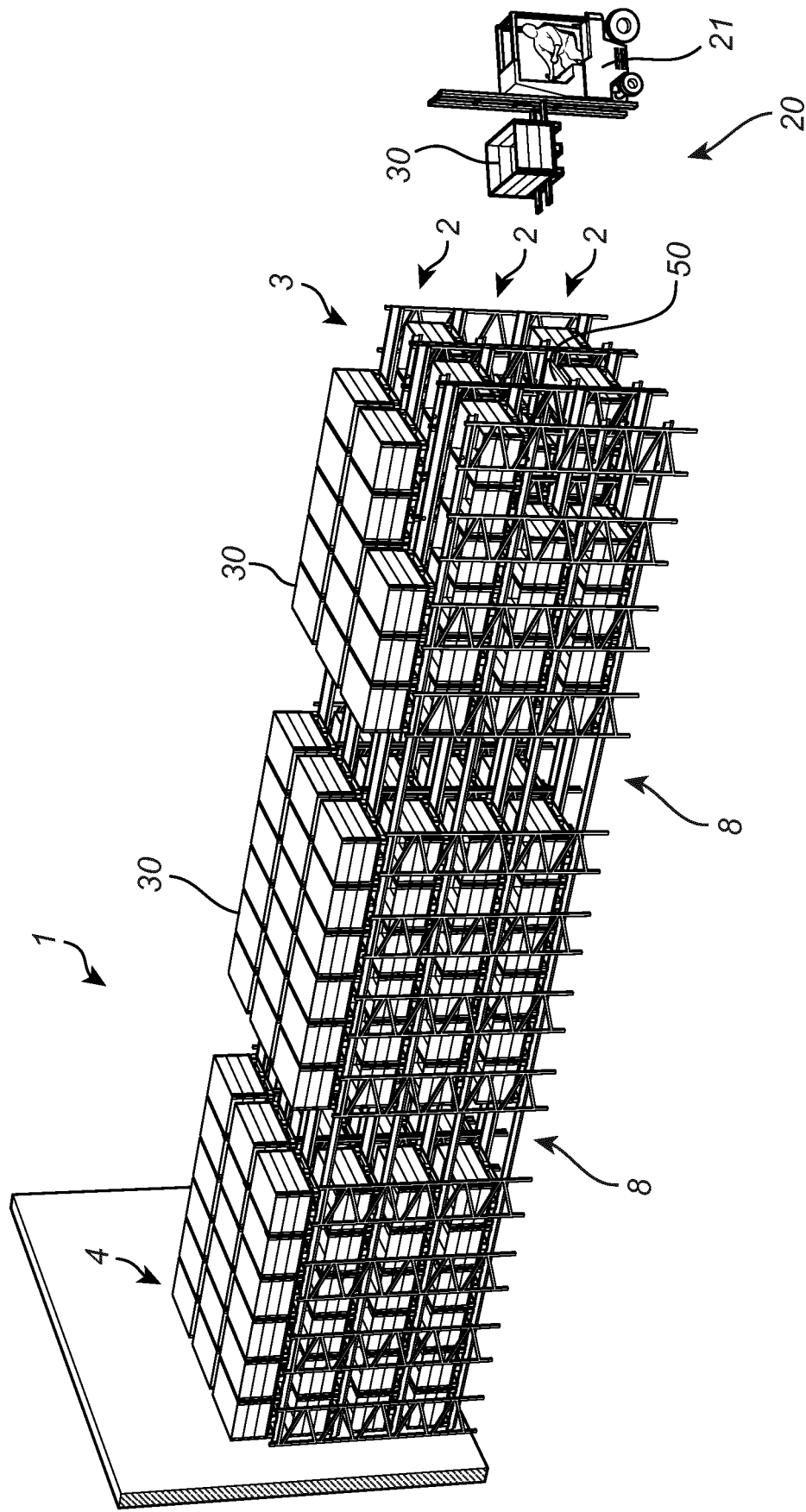
FIG. 1 is a perspective view of a pallet rack.
Figure 2:
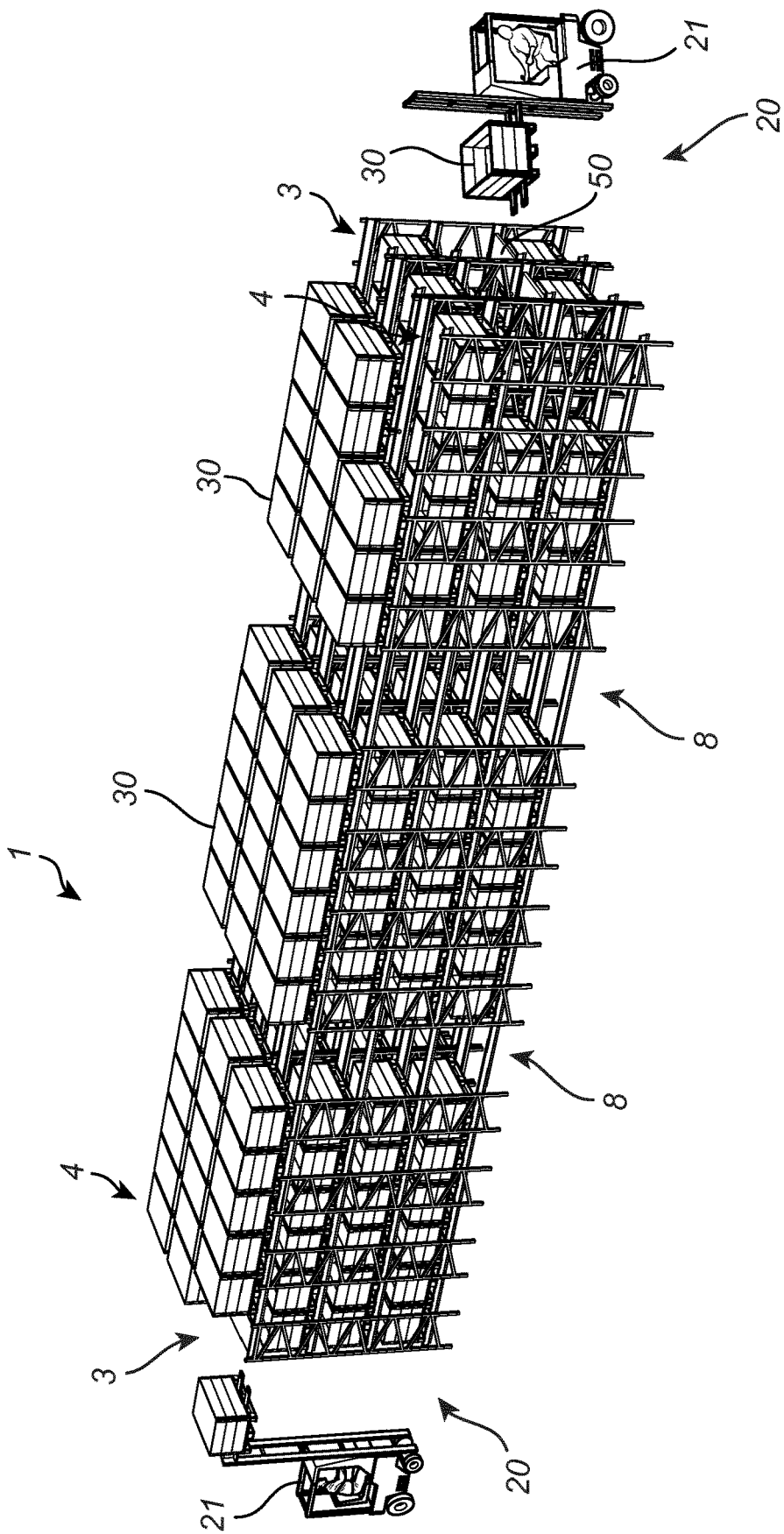
FIG. 2 is a perspective view of a pallet rack.

FIG. 1 and FIG. 2 are perspective views of pallet racks 1 illustrating two embodiments of the inventive concept. The figures show pallet racks 1 comprising a number of pallet rack channels 2. A forklift 21 driving in an aisle 20 next to the pallet rack 1 lifts a pallet 30 into a pallet rack channel 2. The pallet 30 can subsequently be transported further into the pallet rack channel 2 by an automated vehicle 50. The forklift 21 loads the pallet 30 onto the automated vehicle 50 at the load end 3 of the pallet rack channel 2. The automated vehicle 50 can then place the pallet 30 between the load end 3 and the far end 4 of the pallet rack channel 2. The pallet rack 1 may be arranged so that the forklift only have access to one side of the pallet rack 1, as in FIG. 1. Alternatively, the pallet rack 1 may be arranged so that the forklift 21 has access to the pallet rack 1 from two sides, as in FIG. 2. In the latter case what is the load end 3 and the far end 4 depends on which side the forklift 21 loads the pallet 30 into the pallet rack channel 2, as shown in FIG. 2. FIG. 1 and FIG. 2 furthermore illustrates the pallets 30 being stored in the pallet rack 1 in a manner where firebreaks 8 are formed. The firebreaks 8 are gaps in between stored pallets 30. In the embodiments of FIG. 1 and FIG. 2 the firebreaks 8 extend over several pallet rack channels 2.

Figure 3:
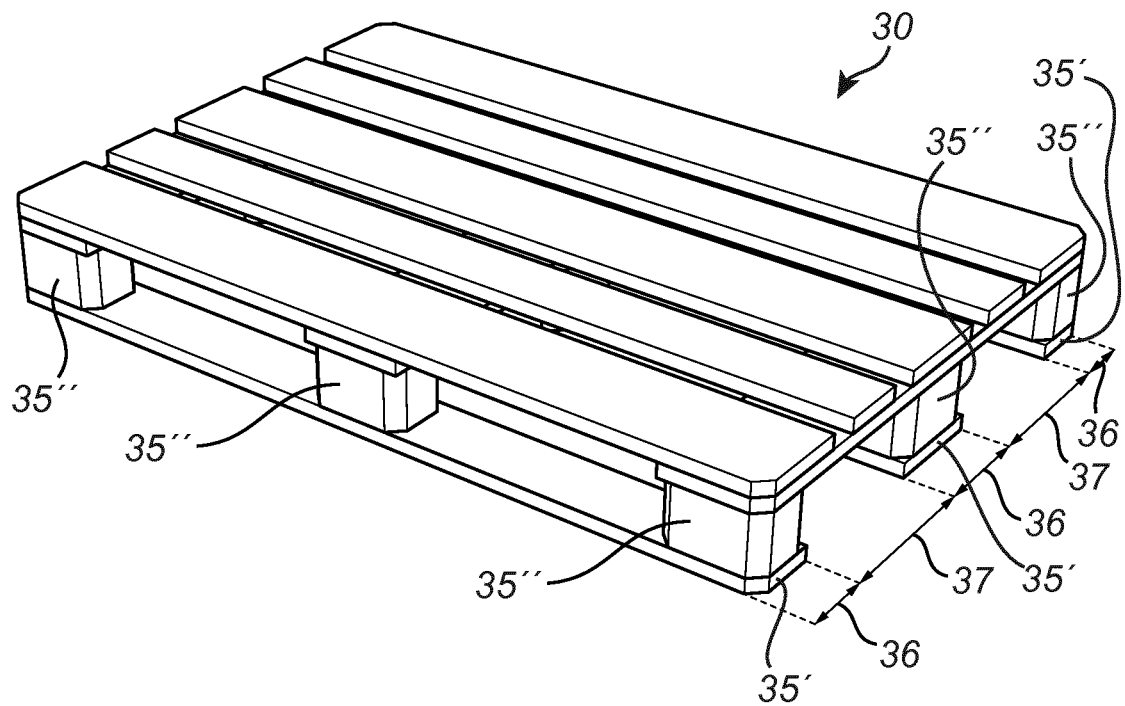
FIG. 3 is a perspective view of a pallet.

FIG. 3 is a perspective view of a pallet 30 without a load. The pallet 30 in the figure may be a europallet. The pallet 30 has three bottom boards 35' and nine blocks 35" which all function as deckboard supports 35. The bottom boards 35' may be used to define pallet characteristics. The width 36 of the bottom boards 35' may e.g. be 100 mm for the outermost bottom boards 35' and 145 mm for the center bottom boards 35' for a europallet. The distance 37 between two bottom boards 35' may e.g. be 227.5 mm for a europallet. The amount 38 of bottom boards 35' may e.g. be 3 for a europallet. However, the inventive concept does not relate only to europallets. Other pallet types with other pallet characteristics may also be used. It should be understood that even though FIG. 3 illustrates pallet characteristics of in terms of widths 36 of the bottom boards 35' and distances 37 between two bottom boards 35' widths of the blocks 35" and distances between the blocks 35" may also be used as pallet characteristics. For example, the width and distances between blocks 35", measured in a direction along the length direction of the bottom boards 35', may be used as pallet characteristics. The width and distances between blocks 35", measured in a direction perpendicular to the length direction of the bottom boards 35', may also be used as pallet characteristics. Combinations of measures relating to the blocks and measures relating to the bottom boards may also be used as pallet characteristics.

Figures 4, 5:
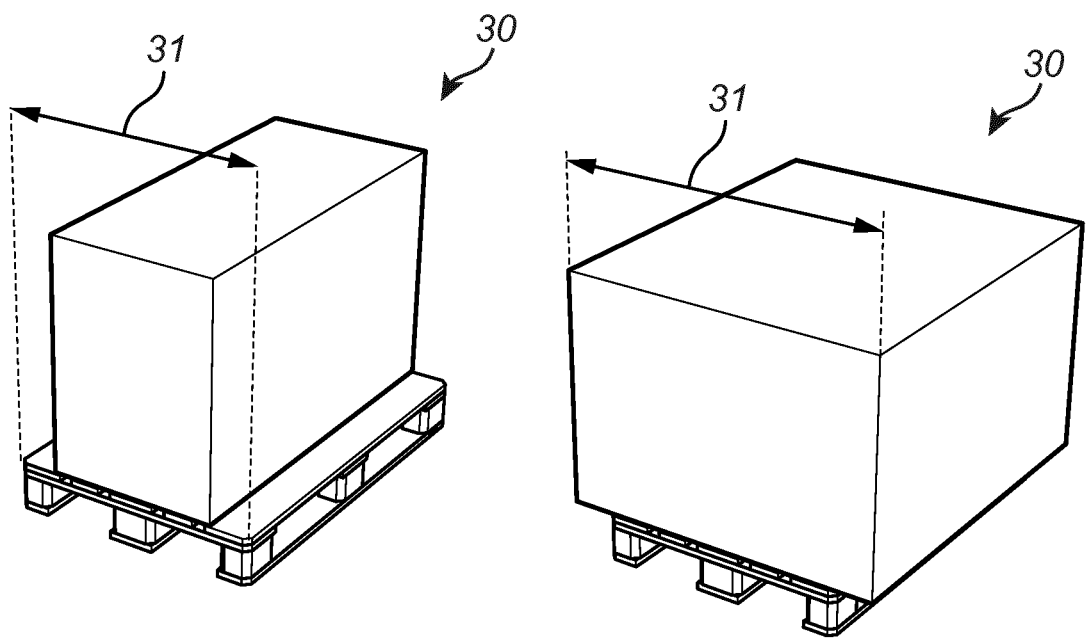
FIG. 4 is a perspective view of a pallet.
FIG. 5 is a perspective view of a pallet.

FIG. 4 and FIG. 5 are perspective views of pallets 30 with a load. FIG. 4 shows a pallet 30 with a load which does not extend beyond the edges of the pallet 30. The pallet depth 31 is the same as the width of the pallet 30 in FIG. 4. FIG. 5 shows a pallet 30 with a load which does extend beyond the edges of the pallet 30. The pallet depth 31 is the same as the width of the load in FIG. 5.

FIG. 6 and FIG. 7 are side views of pallet racks channels 2. FIG. 6 and FIG. 7 illustrate embodiments wherein the firebreak zones 7 are aligned with fire sprinklers 22. Part of the water from a fire sprinkler 22 may thus be transported through the pallet rack channel 2 to wet also underlying pallet rack channels 2 as well as the sides of the pallets 30 in the underlying pallet rack channels 2. The firebreak zones 7 in these embodiments have a firebreak zone width 90 and a firebreak zone spacing 91. The automated vehicle 50 may place the pallets 30 such that firebreaks 8 are formed at the position of the determined firebreak zones 7. By placing the pallets 30 according to the same firebreak zones 7 for pallet rack channels 2 which lie on top of each other the firebreak 8 may cut through several pallet rack channels 2. In the embodiment of FIG. 7 a distance 92 between the load end 3 and the firebreak zone 7 in the pallet rack channel 2 which is closest to the load end 3 is marked. By changing the distance 92 the firebreak zones 7 may be shifted along the pallet rack channel 2.

Pallets 30 with the same pallet depth 31 may be stored in the same pallet rack channel 2 as in FIG. 6. Pallets 30 with different pallet depth 31 may also be stored in the same pallet rack channel 2 as in FIG. 7. The pallets 30 may be of different types or of the same type. The sum of the pallet depths 31 for the pallets 30 in between two firebreak zones 7 may not necessarily add up to equal the fire break zone spacing 91 as illustrated in FIG. 7. If there is no room for a new pallet 30 in between a previously stored pallet 30 and a firebreak zone 7, the next pallet 30 may be stored on the other side of the firebreak zone 7.

Figure 8:
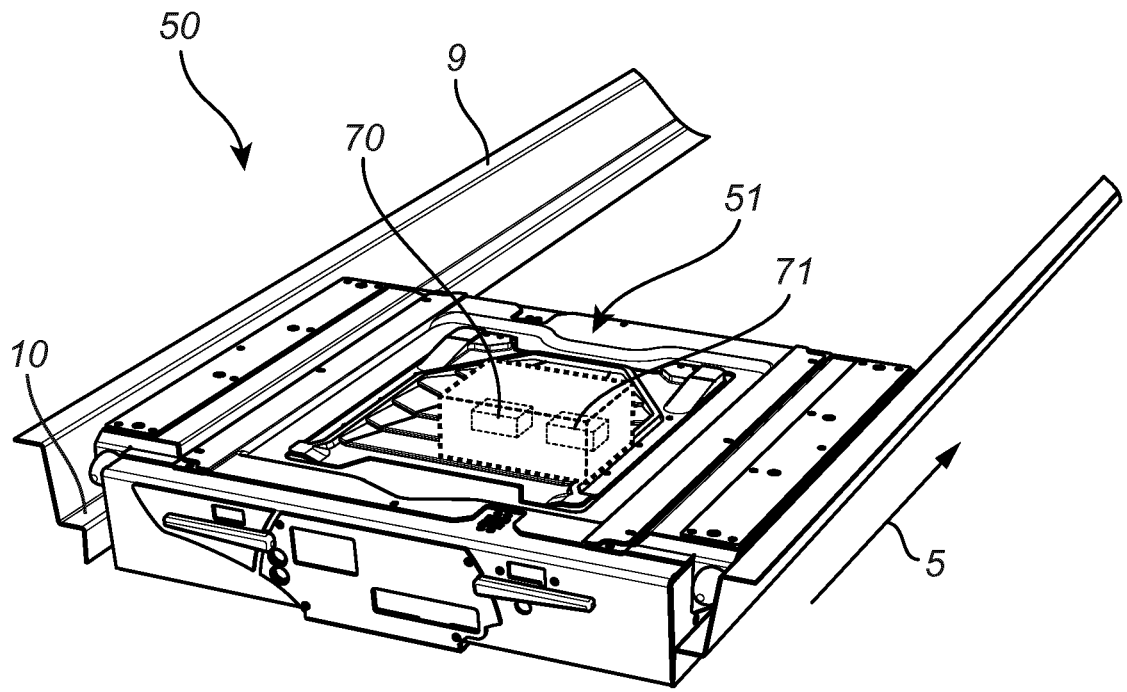
FIG. 8 is a perspective view of an automated vehicle in a pallet rack channel.
Figure 9:
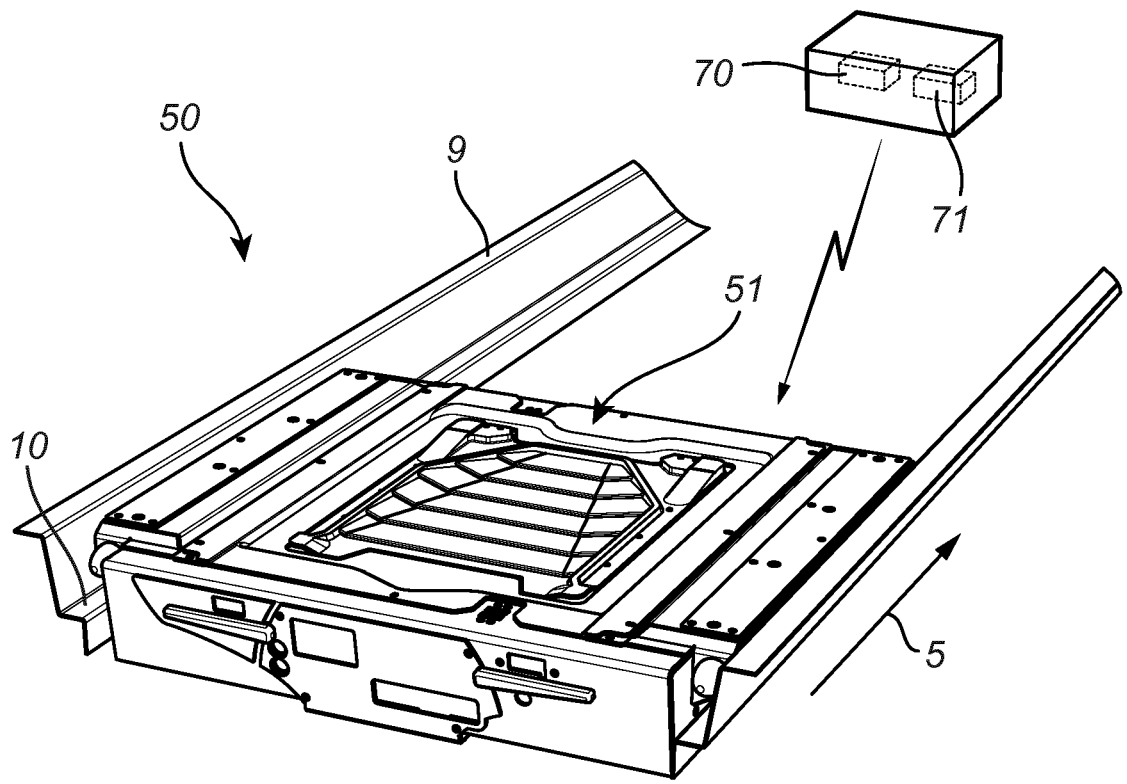
FIG. 9 is a perspective view of an automated vehicle in a pallet rack channel.

FIG. 8 and FIG. 9 are a perspective view of an automated vehicle 50 in a pallet rack channel 2 which extends along one direction 5. In the embodiment of FIG. 8 the automated vehicle 50 has a processor 70. The processor 70 may perform the method according to the inventive concept and thereby determine a transport instruction. In the embodiment of FIG. 9 a server 60 has a processor 70. In this embodiment the processor 70 of the server 60 may perform the method according to the inventive concept and thereby determine a transport instruction. The server 60 may communicate wirelessly with the automated vehicle 50 such that the automated vehicle 50 may implement the transport instructions.

A computer memory 71 may be used to store information which may facilitate performing the method according to the inventive concept. The computer memory 71 may be situated e.g. in the automated vehicle 50 or in a server 60. The computer memory 71 does not necessarily need to be situated in the same device as the processor 70. The computer memory 71 may store information such as e.g. a list mapping a plurality of pallet depths 31 of a pallet 30 and a plurality of predefined characteristics, a list mapping a plurality of widths of the goods on different types of pallets 30 to a plurality of predefined characteristics, information about previous transports of pallets 30 with goods in the pallet rack channel 2, information about a firebreak zone width 90, information about a firebreak zone spacing 91, information about a distance 93 between the load end and the firebreak zone in the pallet rack channel, information about a firebreak zone list. Other information may also be stored in computer memories 71. Several computer memories 71 which may be situated in different devices may also be used.

In the embodiments of FIG. 8 and FIG. 9 the pallet rack channel 2 comprises a top set of rails 9 and a bottom set of rails 10. The automated vehicle 50 may move on the bottom set of rails 10. By raising a platform 51 the automated vehicle 50 may lift a pallet 30 and drive along the bottom set of rails 10 with the pallet hovering above the top set of rails 9. The automated vehicle 50 may lower the platform 51 to place the pallet 30 on the top set of rails 9.

Figure 10:
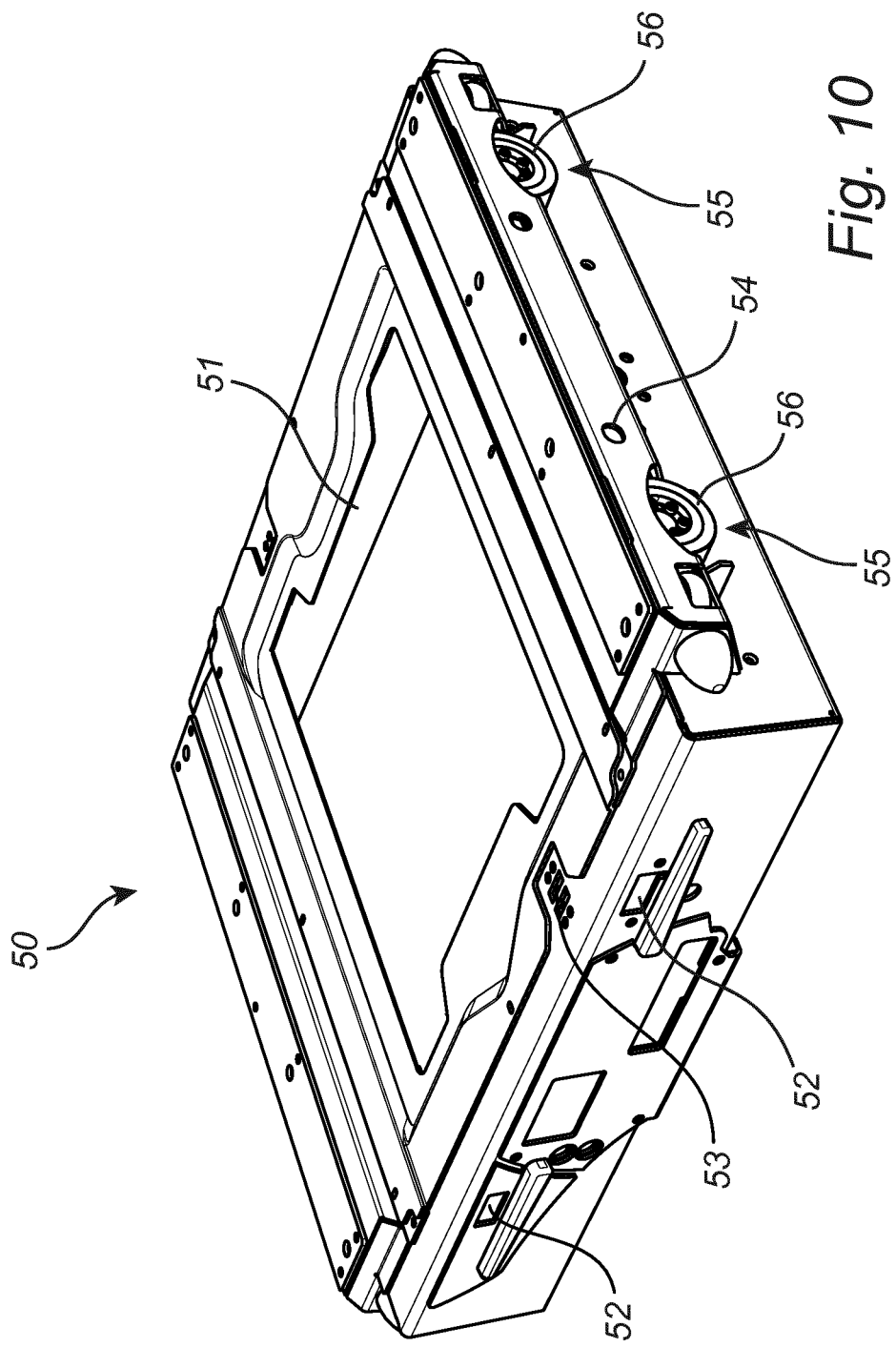
FIG. 10 is a perspective view of an automated vehicle.

FIG. 10 is a perspective view of an automated vehicle 50. In this embodiment the automated vehicle 50 has wheels 56 to move and a platform 51 which can lift a pallet 30. In this embodiment the automated vehicle 50 has a sensor 55 measuring the distance travelled. Furthermore, in this embodiment the automated vehicle 50 has a forward looking sensor 52, an upward looking sensor 53, and a side looking sensor 54. The sensor 55 measuring the distance travelled may be a magnetic sensor connected to a wheel 56 such that a magnet rotates with the wheel 56 and induces a current pulse in one or more coils such that a number of revolutions, or parts of revolutions may be measured. A distance travelled by the automated vehicle may be derived from the number of revolutions, or parts of revolutions, combined with the circumference of the wheel 56. The forward looking sensor 52, the upward looking sensor 53, and the side looking sensor 54 may e.g. be optical sensors which emits a light beam 23 and detects a reflection. The intensity or the position of the reflection on a photodetector or a photodetector array may be used to measure the presence of a feature or the distance to a feature on a pallet 30.

For example, the upward looking sensor 53 may emit a light beam 23 and detect that the intensity of the reflection increases when the upward looking sensor 53 passes underneath a deckboard support 35 in the form of a bottom board 35'. The signal from the upward looking sensor 53 may thus be used to determine a pallet characteristic. As the automated vehicle 50 passes underneath a pallet 30 it may register a pattern of changing reflection intensity from the upward looking sensor 53. When this information is combined with a travelled distance from the sensor 55 the width 36 of a deckboard support 35, the distance 37 between two deckboard supports 35, and the amount 38 of deckboard supports 35 may be calculated. It may then be possible to conclude that the pallet 30 above the automated vehicle 50 is of a certain type, e.g. a europallet. It may also be possible to estimate where the innermost deckboard support 35 in the pallet rack channel 2 ends and align it to a reference point on the automated vehicle 50. It may also be possible to derive where the innermost deckboard support 35 ends from the reflection intensity. It may also be possible to derive how much a load extends outside a pallet 30 from the reflection intensity.

The side looking sensor 54 may be used to detect a change in the reflection intensity from e.g. a light beam 23 pointing into the rails of the pallet rack channel 2. Thus a reference point e.g. a drilled hole in the rails of the pallet rack channel 2 may be detected.

The forward looking sensor 52 may be used to detect a pallet 30 in front of the automated vehicle 50. The forward looking sensor 52 may also be used to measure a distance to a pallet 30 in front of the automated vehicle 50. For example, the forward looking sensor 52 may e.g. comprise a laser emitting a light beam 23, wherein the beam is pointed along the automated vehicle's 50 forward direction of the pallet rack channel 2 at an angle to the one direction 5 of the pallet rack channel 2. When the light beam 23 hit a pallet 30 or the load of a pallet 30 a laser spot may form on the pallet 30 or the load of a pallet 30. The lateral position of the light spot within the pallet rack channel 2 may be used to calculate the distance from the laser to the laser spot. The lateral position of the light spot may be detected by e.g. a photodetector such as a single photo diode, an array of photo diodes, or a cmos or ccd camera. In one embodiment, two light beam 23 are used wherein the lasers are arranged such that their respective laser spots crosses at a given distance. The two light beams 23 may be angled such that the laser spots move both horizontally and vertically in a plane perpendicular to the one direction 5 of the pallet rack channel 2 as the automated vehicle approaches the plane. The two light beams 23 may be angled such that the laser spots moves to draw a cross in the form of an X in a plane perpendicular to the one direction 5 of the pallet rack channel 2 as the automated vehicle approaches the plane.

Figure 11:
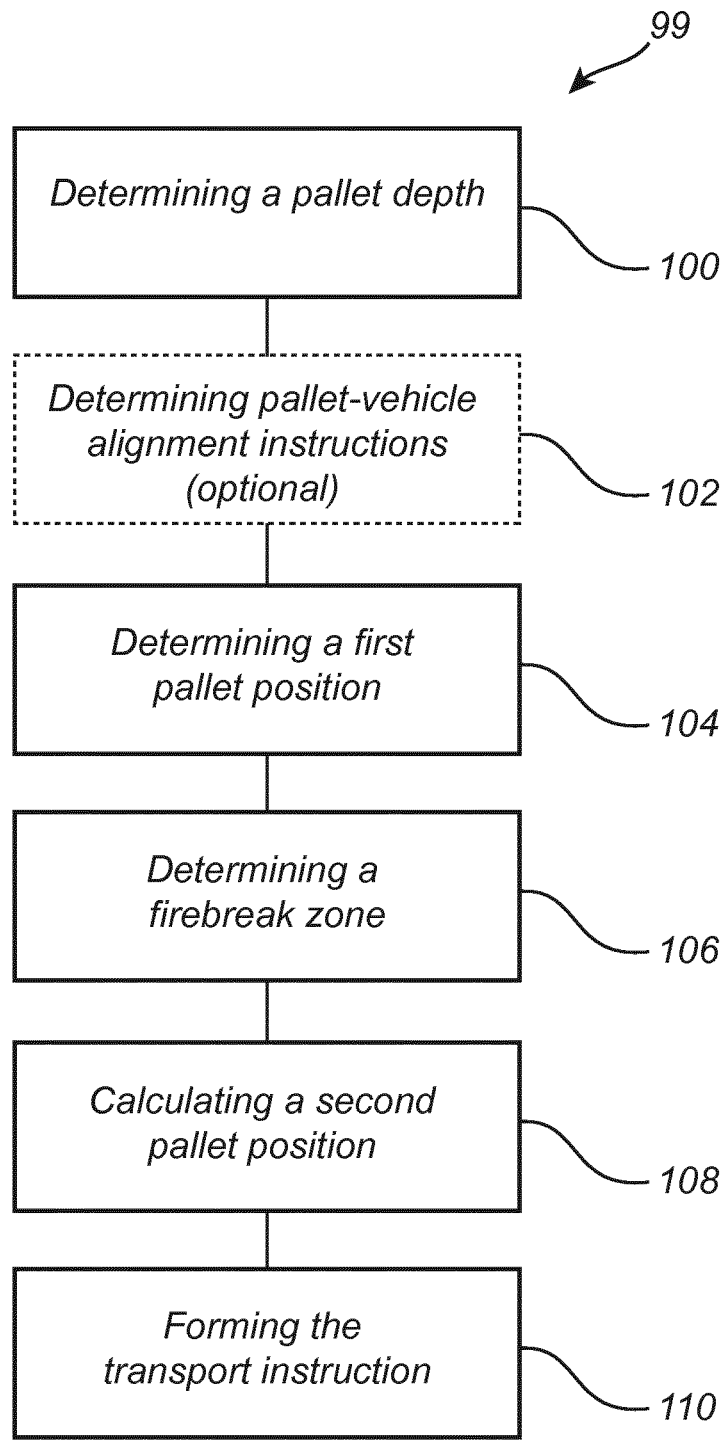
FIG. 11 is a flow chart of a computer implemented method for determining a transport instruction for an automated vehicle.

FIG. 11 shows a flow chart illustrating a computer implemented method 99 for determining a transport instruction for an automated vehicle 50. In the following the method 99 will be described as implemented in a processor 70 in the automated vehicle 50, wherein the automated vehicle 50 moves a pallet 30 which has recently been placed at the load end 3 of a pallet rack channel 2. However, it should be understood that the method 99 can also relate to a pallet 30 already placed on the automated vehicle 50 or a pallet 30 already stored in the pallet rack channel 2 wherein the pallet 30 should be repositioned. The method 99 may also be implemented in a processor 70 in a server 60 or in another device with sufficient computational power. The steps of the method 99 does not necessarily need to be performed in the following order.

Figure 12:
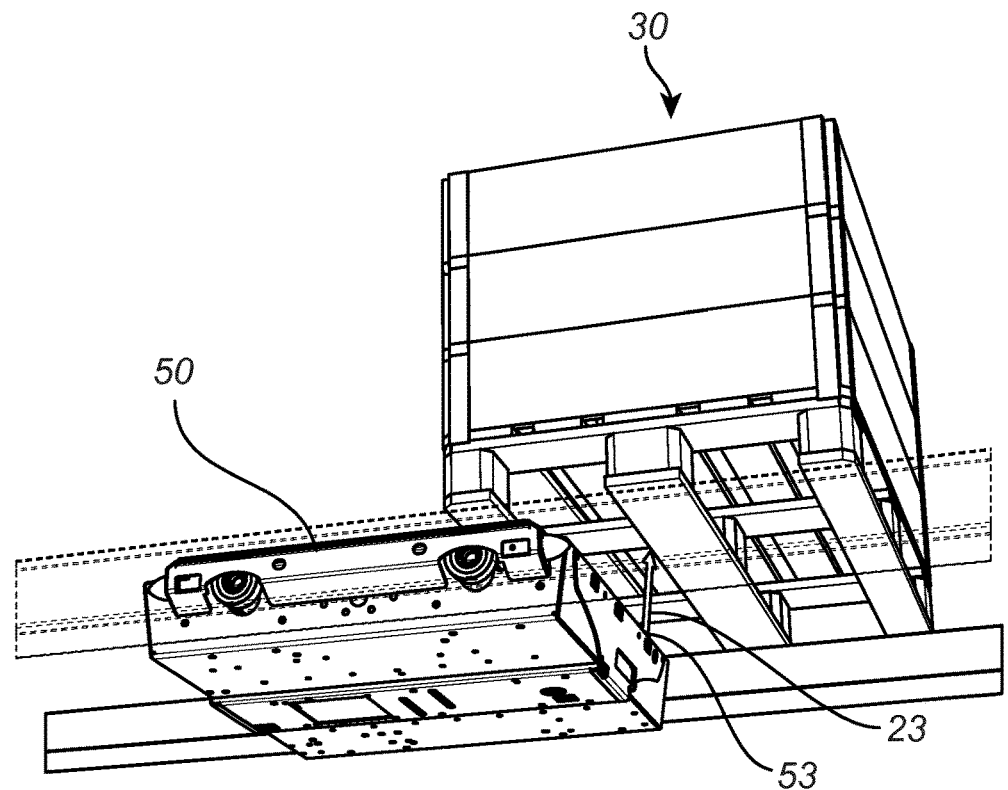
FIG. 12 is a perspective view of an automated vehicle in a pallet rack channel.

According to the method 99 a pallet depth 31 is determined 100. In one embodiment this is done by moving the automated vehicle 50 underneath the pallet 30 with the platform 51 lowered. The upward looking sensor 53 detects the width 36 of the deckboard supports 35, the distance 37 between the deckboard supports 35, and the amount 38 of deckboard supports 35. These pallet characteristics are compared with a list in a computer memory 71, wherein the list maps the characteristics to a pallet depth 31. In another embodiment the pallet depth 31 is directly measured by the upward looking sensor 53. FIG. 12 is a perspective view of an automated vehicle 50 moving underneath a pallet 30 wherein a light beam 23 from the upward looking sensor 53 is used to detect deckboard supports 35 in the form of bottom boards 35'. If the pallet 30 is placed too close to the load end 3 of the pallet rack channel 3 the automated vehicle 50 may lift the pallet, transport it further into the pallet rack channel 2, put the pallet 30 down, and then scan the deckboard supports 35 by moving underneath the pallet 30.

In one embodiment the optional step of determining pallet-vehicle alignment instructions 102 is performed. In one embodiment this is done by moving the automated vehicle 50 underneath the pallet 30 until the upward looking sensor 53 detects the innermost edge of the innermost bottom board 35'. Innermost bottom board 35' herein refers to the bottom board 35' of the pallet 30 which is furthest from the load end 3.

Figure 13:
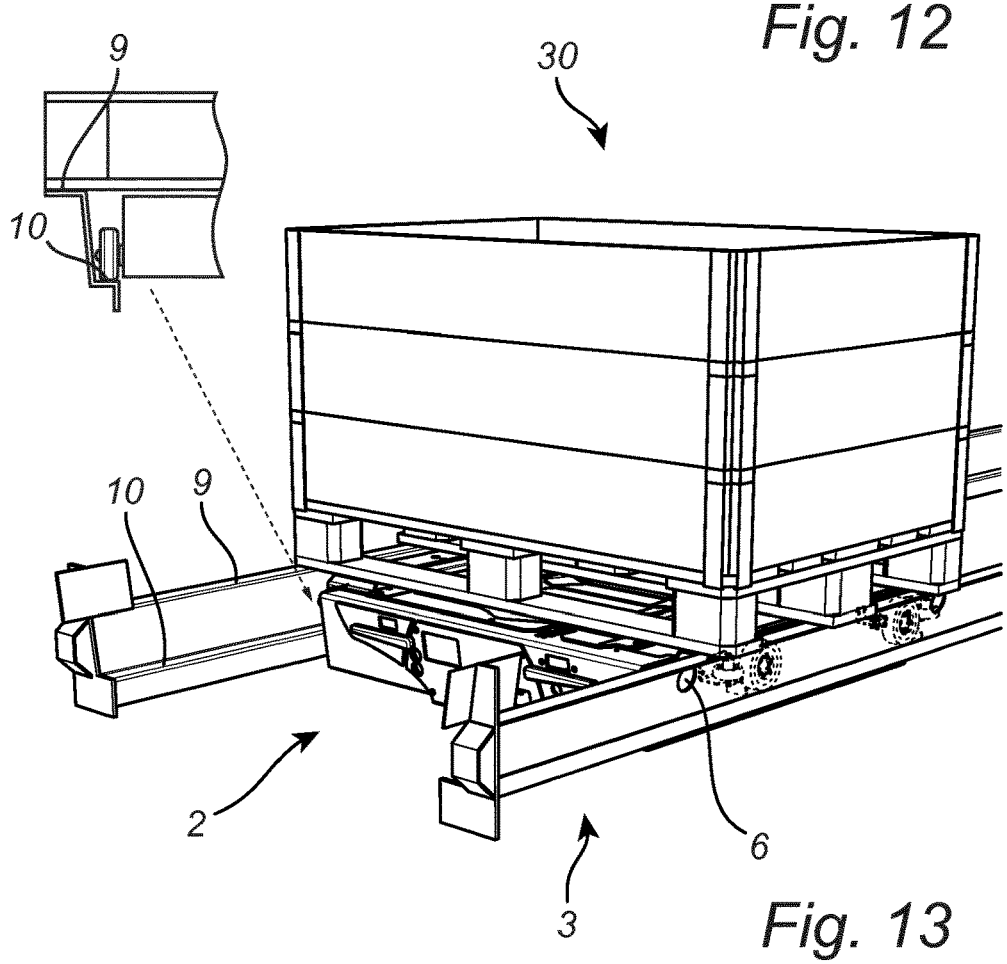
FIG. 13 is a perspective view of an automated vehicle in a pallet rack channel.

In one embodiments the automated vehicle 50 subsequently positions itself underneath the pallet 30 and lifts the pallet 30 using the platform 51. The automated vehicle 50 may also detect a reference mark 6 at the load end 3 of the pallet rack channel 2 using the side looking sensor 54. FIG. 13 shows a perspective view of an automated vehicle 50 at the load end 3 of a pallet rack channel 2 wherein the reference mark 6 is a drilled hole in the rails of the pallet rack channel 2. In other embodiments the reference mark 6 may be e.g. a bar code, a QR code, a RFID tag or similar.

According to the method 99 a first pallet position 33 is determined 104. In one embodiment the pallet position is determined as the distance from a reference mark 6 at the load end 3 of the pallet rack channel 2 to the outermost pallet 30 as seen from the load end 30. The distance may be measured by measuring a distance travelled from the reference mark 6 using a sensor 55 measuring the distance travelled by the automated vehicle 50 and measuring the remaining distance to the outermost pallet 30 using a forward looking sensor 52. The two distances may be added to calculate the first pallet position 33. A known distance between the sensor 55 and the forward looking sensor 52 may be included in the addition. In another embodiment the first pallet position 33 is received from a computer memory 71, wherein the computer memory 71 stores information about previous transports of pallets 30 with goods in the pallet rack channel 2.

FIG. 14 is a perspective view of an automated vehicle 50 travelling in a pallet rack channel 2 along the one direction 5 between the load end 3 and the far end of the pallet rack channel 2. The automated vehicle 50 measures the distance to a pallet 30 using two light beams 23 from two lasers wherein the lateral movement of the laser spots on the pallet 30 as the automated vehicle 50 approaches the pallet 30 can be used to calculate the distance between the automated vehicle 50 and the pallet 30.

According to the method 99 a firebreak zone 7 is determined 106. In one embodiment pallets 30 are allowed to be stored within a region from the load end 3 up to a firebreak zone spacing 91 from the load end. Then a there is a firebreak zone 7 with a firebreak zone width 90 wherein no pallet should extend. The firebreak zone 7 is subsequently followed by a new region with a length of the firebreak zone spacing 91 wherein pallets are allowed to be stored, and so forth. In another embodiment the first region in the pallet rack channel 2 wherein pallets are allowed to be stored has a width other than the firebreak zone spacing 91. In this embodiment pallets are allowed to be stored within a region from the load end 3 up to a distance 92 between the load end 3 and the first firebreak zone 7 in the pallet rack channel 2. In another embodiment the firebreak zone 7 is determined by receiving a firebreak zone list from a computer memory 71.

According to the method 99 a second pallet position is calculated 108. As illustrated in FIG. 15 there may be situations wherein a pallet 30 with a current pallet position 32 and a pallet depth 31 cannot be placed at the first pallet position 33 without the pallet 30 with its load extending into the firebreak zone 7. The second pallet position 34 may then be set to be on the opposite side of the firebreak zone 7, just outside the firebreak zone 7. As illustrated in FIG. 16 there may also be situations wherein a pallet 30 with a current pallet position 32 and a pallet depth 31 can be placed at the first pallet position 33 without the pallet 30 with its load extending into the firebreak zone 7. The second pallet position 34 may then be set to be the first pallet position 33 or a position close to the first pallet position 33 wherein the pallet 30 with its load does not extend into the firebreak zone 7.

According to the method 99 a transport instruction is formed 110. For example, if the automated vehicle 50 is placed such that the current pallet position 32 is the same as the calculated 108 second pallet position 34 the transport instruction may be to lower the platform 51 and place the pallet 30 at this position. If the automated vehicle 50 is placed such that the current pallet position 32 is some distance from the first pallet position 33 and the pallet 30 transported by the automated vehicle 50 fits between the first pallet position 33 and the fire break zone 7 the transport instruction may be to continue driving until it reaches the first pallet position 33 and place the pallet 30 there. Another example may be that the automated vehicle 50 is moving through a fire break zone 7 while measuring the distance to a pallet 30 on the other side of the fire break zone to determine 104 the first pallet position 33. When the first pallet position 33 is determined 104 further calculations may reveal that there is no room for the pallet 30 transported by the automated vehicle 50 between the fire break zone 7 and the first pallet position 33. The transport instruction may then be to reverse and place the pallet 30 on the other side of the fire break zone 7. Other examples of transport instructions will be obvious to the skilled person.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A computer implemented method for determining a transport instruction for an automated vehicle which transports a pallet with goods in a pallet rack channel, wherein the pallet rack channel is a shelf in a pallet rack which accepts a plurality of pallets to be stored sequentially along one direction between a load end of the pallet rack channel and a far end of the pallet rack channel, wherein the automated vehicle is a vehicle which can automatically transport the pallet from the load end to a pallet position, wherein the pallet position is a position of the pallet along the one direction between the load end and the far end, and wherein the transport instruction is an instruction to the automated vehicle to transport the pallet to the pallet position, the method comprising:
determining a pallet depth, wherein the pallet depth is a measure of a space that the pallet with goods will occupy along the one direction of the pallet rack channel when the pallet is stored in the pallet rack channel;
determining a first pallet position, wherein the first pallet position is the pallet position furthest from the load end which is free to accept a pallet to be stored;
determining a firebreak zone, wherein the firebreak zone is a region along the one direction of the pallet rack channel in which no pallet with goods should extend;
calculating a second pallet position from the determined pallet depth, the determined first pallet position and the determined firebreak zone, such that the second pallet position lies between the load end and the first pallet position and such that the pallet with the pallet depth does not extend into the firebreak zone when it is stored at the second pallet position; and
forming the transport instruction based on the second pallet position such that the automated vehicle can transport the pallet to the second pallet position.

2. The method according to claim 1, wherein determining a pallet depth comprises determining a pallet characteristic from which the pallet depth can be derived.

3. The method according to claim 2, wherein the pallet characteristic is at least one of: a width of a deckboard support of the pallet, a distance between two deckboard supports of the pallet, and an amount of deckboard supports that the pallet comprises.

4. The method according to claim 2, wherein determining a pallet depth further comprises comparing the determined characteristic to a list stored in a computer memory, the list mapping a plurality of pallet depths of a pallet and a plurality of predefined characteristics.

5. The method according to claim 1, wherein determining a pallet depth further comprises setting the pallet depth to a width of the pallet along the one direction of the pallet rack channel when the pallet is stored in the pallet rack channel.

6. The method according to claim 1, wherein determining a pallet depth further comprises setting the pallet depth to a width of the goods on the pallet along the one direction of the pallet rack channel when the pallet is stored in the pallet rack channel.

7. The method according to claim 1, wherein determining the first pallet position comprises determining a distance measurement by the automated vehicle in the pallet rack channel, wherein the distance measurement relates to at least one of: a distance between the automated vehicle and a pallet already stored in the pallet rack channel, a distance between the automated vehicle and the load end.

8. The method according to claim 1, wherein determining the first pallet position comprises receiving a position from a computer memory, wherein the computer memory stores information about previous transports of pallets with goods in the pallet rack channel.

9. The method according to claim 1, wherein determining the firebreak zone comprises receiving a firebreak zone width and a firebreak zone spacing for a periodic repetition of firebreak zones in the pallet rack channel, wherein the firebreak zone width is the width of the individual firebreak zones in the periodic repetition of firebreak zones along the one direction of the pallet rack channel, and wherein the fire break zone spacing is the spacing between the individual firebreak zones in the periodic repetition of firebreak zones along the one direction of the pallet rack channel.

10. The method according to claim 9, wherein determining the firebreak zone further comprises receiving a distance between the load end and the firebreak zone in the pallet rack channel which is closest to the load end, the distance being a distance along the one direction of the pallet rack channel.

11. The method according to claim 1, wherein determining the firebreak zone comprises receiving a firebreak zone list from a computer memory, wherein the firebreak zone list defines at least one region in the pallet rack channel which is a firebreak zone.

12. The method according to claim 1, the method further comprising determining pallet-vehicle alignment instructions, wherein the pallet-vehicle alignment instructions are instructions to the automated vehicle such that it can align a predefined reference point on the pallet with a predefined reference point on the automated vehicle.

13. A non-transitory computer-readable medium storing computer-readable instructions which, when executed on a processing unit, will cause the processing unit to perform the method according to claim 1.

14. A device connected to an automated vehicle which transports a pallet with goods in a pallet rack channel, wherein the device is configured to determine a transport instruction for the automated vehicle, wherein the pallet rack channel is a shelf in a pallet rack which accepts a plurality of pallets to be stored sequentially along one direction between a load end of the pallet rack channel and a far end of the pallet rack channel, wherein the automated vehicle is a vehicle which can automatically transport the pallet from the load end to a pallet position, wherein the pallet position is a position of the pallet along the one direction between the load end and the far end, and wherein the transport instruction is an instruction to the automated vehicle to transport the pallet to the pallet position, the device comprising one or more processors configured to:
- determine a pallet depth, wherein the pallet depth is a measure of a space that the pallet with goods will occupy along the one direction of the pallet rack channel when the pallet is stored in the pallet rack channel;
- determine a first pallet position, wherein the first pallet position is the pallet position furthest from the load end which is free to accept a pallet to be stored;
- determine a firebreak zone, wherein the firebreak zone is a region along the one direction of the pallet rack channel in which no pallet with goods should extend;
- calculate a second pallet position from the determined pallet depth, the determined first pallet position and the determined firebreak zone, such that the second pallet position lies between the load end and the first pallet position and such that the pallet with the pallet depth does not extend into the firebreak zone when it is stored at the second pallet position; and
- form the transport instruction based on the second pallet position such that the automated vehicle can transport the pallet to the second pallet position.

15. The device according to claim 14, wherein the device is implemented in the automated vehicle.

* * * * *